April 5, 1966 J. E. GAFFNEY, JR., ET AL 3,245,043

MESSAGE COMMUNICATION SYSTEMS WITH INTERSTATION
INFORMATION STORAGE AND TRANSMISSION
Filed Nov. 10, 1961

INVENTORS
JOHN E. GAFFNEY, JR.
ARTHUR A. KUSNICK
BY Stephen J. Limanek
ATTORNEY

United States Patent Office 3,245,043
Patented Apr. 5, 1966

3,245,043

MESSAGE COMMUNICATION SYSTEMS WITH INTERSTATION INFORMATION STORAGE AND TRANSMISSION

John E. Gaffney, Jr., San Jose, Calif., and Arthur A. Kusnick, Peekskill, N.Y., assignors to International Business Machines Corporation, New York, N.Y., a corporation of New York Filed Nov. 10, 1961, Ser. No. 151,536
8 Claims. (Cl. 340—172.5)

This invention relates to message communication systems and more particularly to systems having a plurality of stations, which may be widely distributed or scattered throughout a large territory, interconnected serially to a data processing unit or computer.

In recent years the development trend in the data processing industry has been directed at the introduction of systems allowing exchange of information data between remotely located points through long transmission or communication lines, whereas in earlier years data processed by a computer was fed locally into the computer, for example, by feeding information in punched card form into the computer. Since computers are capable of storing and handling a large volume of information, data from a large number of sources or remote locations may be fed into a single computer and desired information may be derived from the computer, and transmitted to one or more specified remote locations. If each of the locations were directly connected by a separate line to the computer or data processing unit, the cost of transmitting the information along each of these lines would be extremely high unless each of the lines carried traffic a large portion of the time. To provide more efficient transmission of information or more efficient utilization of transmission equipment when a location does not warrant a separate transmission, line facilities have been provided in communication systems to store queues of information in buffers at a plurality of locations and to apply each of the queues of information to a single line at given time intervals for transmission to a computer.

In prior art systems, for example, in the system described in U.S. Patent 2,982,809, means have been provided for transmitting signals individual to various stations connected to a transmission line for inviting the stations to transmit messages to a central processing unit on a predetermined sequential basis. A system of this type requires special signal generating means at one or more locations in the system and valuable transmission line time is required to send these special or control signals between units of the system.

Accordingly, it is an object of this invention to provide an improved message communication system.

It is another object of this invention to provide an improved communication system in which a plurality of widely spaced apart stations are connected to a data processing unit.

Still another object of this invention is to provide an improved message communication system having a plurality of spaced apart serially-connected stations which does not require signals for inviting the stations to transmit their information to the processing unit.

A further object of this invention is to provide an improved system which more efficiently uses a transmission line interconnecting a plurality of distributed stations to a processing unit.

In accordance with the present invention a message communication system is provided having a plurality of serially-interconnected stations wherein each of the stations is provided with means for transmitting messages from other stations to a processing unit without delay or, alternatively, with a delay time not greater than the time for transmission of information from one or more terminals at the local station.

An important advantage of this invention is that an inexpensive communication system is provided which utilizes a transmission line for transmission of messages for a maximum amount of time in any given interval of time with little or substantially no waiting time for applying messages to the transmission line from input terminals of each of the stations.

An important feature of this invention is that special signals need not be transmitted through the transmission line to invite the station to apply their information to the line.

The foregoing and other objects, features and advantages of the invention will be apparent from the following more particular description of preferred embodiments of the invention, as illustrated in the accompanying drawing.

Figure 1:
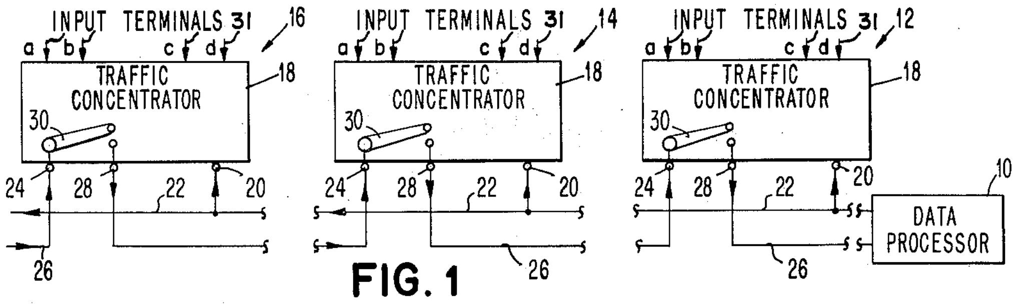
FIG. 1 illustrates the system of the present invention.

Referring to the drawing in more detail, there is shown in FIG. 1 the system of the present invention which includes a data processor 10, and first, second and third stations 12, 14 and 16 serially connected to the data processor 10. Each of the stations 12, 14 and 16 includes a traffic concentrator 18 having a plurality of input terminals, for example, 31, indicated in part as *a*, *b*, *c* and *d*, a first receiving terminal 20 connected to an outgoing transmission line 22 from the data processor 10, a second receiving terminal 24 connected to an "up-line" portion of an incoming transmission line 26 feeding data signals into the data processor 10 and a transmitting terminal 28 connected to a "down-line" portion of the incoming transmission line 26. It will be understood that the term "down-line" portion of the incoming transmission line 26 refers to the portion of the incoming transmission line 26 which, with respect to any given station, extends between the given station and the data processor 10 and that the term "up-line" portion of the incoming line 26 is the remaining portion of the incoming transmission line 26. The traffic concentrator 18, which will be described in more detail hereinbelow in connection with FIG. 2 of the drawing, includes a switch 30 which in one position passes signals from the up-line portion of the incoming line 26 without delay to the down-line portion of the incoming line 26 and which in another position applies signals from the up-line portion of the incoming line 26 to a buffer while signals from the input terminals of the local station may be applied to the down-line portion of the incoming line 26 through the transmitting terminal 28. The input terminals *a*, *b*, *c* and *d* may receive signals at a predetermined rate of, for example, 5 characters per second or at variable rates, but the signals applied to the down-line portion of the incoming line 26 through the transmitting terminal 28 have preferably a constant repetition rate which is substantially higher than the rate of the signals at the input terminals *a*, *b*, *c* and *d*.

In the operation of the communication system illustrated in FIG. 1 it can be seen that signals from the up-line portion of the incoming transmission line 26 are applied to the second receiving terminal 24 of the third station 16 and either directly or after a short delay are applied to the down-line portion of the incoming line 26 to be later applied to the second receiving terminal 24 of the second station 14, then through the down-line portion of incoming transmission line 26 to the second receiving terminal 24 of the first station 12 and finally to the data processor 10. Information produced by the data processor 10 for transmission along the outgoing line 22 to the stations 12, 14 and 16 is received at one or more of the desired stations by attaching an appropriate address to the information which is receivable only at the addressed stations.

Figure 2:
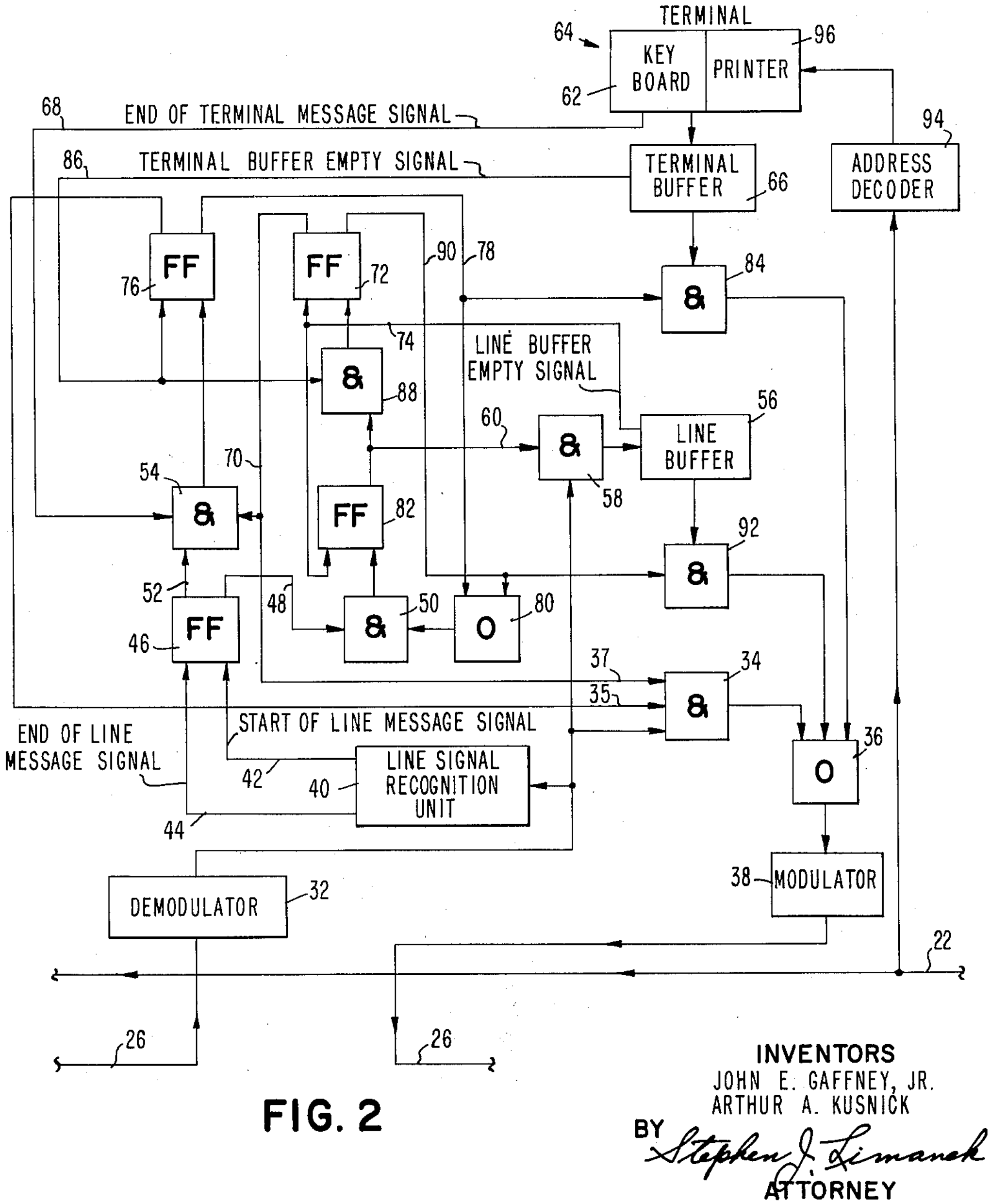
FIG. 2 illustrates somewhat in detail a concentrator which may be used at a station of the system shown in FIG. 1.

In FIG. 2 there is illustrated a circuit for a station having a single terminal which may be used as the traffic concentrator 18 at any of the stations illustrated in FIG. 1 of the drawing. Although a single terminal, which may be of a conventional type, is illustrated in FIG. 2 it should be understood that the station may be provided with a plurality of terminals which feed information in any known manner to the station. When signals forming a message block are received at a demodulator 32 of the circuit of FIG. 2 from the up-line portion of the incoming transmission line 26, the up-line signals are demodulated from a carrier form to conventional digital signals and pass through a first AND gate 34, provided suitable voltages are applied to lines 35 and 37 to condition the AND gate 34, and a first OR gate 36 to a modulator 38 where carrier signals are regenerated for transmission to the down-line portion of the incoming transmission line 26.

The signals from the demodulator 32 are also applied to a line signal recognition unit 40 which generates from each message block of the demodulated signals a start of line message signal which is applied to a first output line 42 and an end of line message signal which is applied to a second output line 44. The start and end line message signals are used to control a message blocking gate which may be in the form of a bistable multi-vibrator or first flip-flop 46. The start of line message signal when applied to the flip-flop 46 produces a voltage on the first output line 48 of the first flip-flop 46 which conditions a second AND gate 50. When the end of line message signal is applied to the first flip-flop 46, a voltage is produced at a second output line 52 of the flip-flop 46 which partially conditions a third AND gate 54.

The signal from the output of the demodulator 32 may also be applied to a line buffer 56 through a fourth AND gate 58 if an appropriate conditioning voltage has been applied to a line 60 connected to the fourth AND gate 58. The line 60 has applied thereto an appropriate conditioning voltage for AND gate 58 when a keyboard 62 of a terminal 64 has sent a message block into a terminal buffer 66 and an end of terminal message signal to the third AND gate 54 via line 68. The end of line message signal from the line signal recognition unit 40 is applied from line 44 to the first flip-flop 46 to partially condition the third AND gate 54 and a voltage is applied to line 70 from a second flip-flop 72 when a line buffer empty signal produced in the line buffer is applied via line 74 to the second flip-flop 72. Thus, with the third AND gate 54 fully conditioned by voltages on lines 52 and 70, the end of terminal message signal passes through the third AND gate 54 to a third flip-flop 76 which applies a voltage on line 78 for conditioning the second AND gate 50 through a second OR gate 80. When the start of line message signal produced by the signal recognition unit 40 is applied from line 42 to the first flip-flop 46, a voltage will be applied through the second AND gate 50 to a fourth flip-flop 82 to produce at the output thereof the conditioning voltage for the fourth AND gate 58.

It can be seen that when the message block from the up-line portion of the incoming line 26 is being applied to the line buffer 56, the terminal buffer 66 which stores the messages produced by the keyboard 62 of the terminal 64 may be transmitting through a fifth AND gate 84, if properly conditioned, to the down-line portion of the incoming line 26 via the OR gate 36 and the modulator 38. The conditioning voltage from the third flip-flop 76 which is on line 78 and which is applied to the second OR gate 80 is also applied as a conditioning voltage to the fifth AND gate 84. When the terminal buffer 66 has completed the transmission of a message block through the fifth AND gate 84 to the transmission line 26, a terminal buffer empty signal is applied to the third flip-flop 76 through a line 86 to provide a partial conditioning voltage on line 35 for the first AND gate 34. The voltage required on line 37 to fully condition the first AND gate 34 is produced by the second flip-flop 72 when the line buffer empty signal is received from the line buffer 56, which conditioning voltage was also used to condition the third AND gate 54. As stated hereinabove when the first AND gate 34 is fully conditioned, the signals from the demodulator 32 are not applied to the line buffer 56 but pass through the first AND gate 34, the first OR gate 36 and the demodulator 38 to the down-line portion of the incoming transmission line 26 without delay. However, when appropriate conditioning voltages are not applied to both line 35 and line 37, the signals from demodulator 32 are stored in the line buffer 56.

When the terminal buffer empty signal is applied to the third flip-flop 76, it is also applied to a sixth AND gate 88 which is conditioned by the voltage from the fourth flip-flop 82, which also conditions the fourth AND gate 58. Thus, the terminal buffer empty signal passes through the sixth AND gate 88 to the second flip-flop 72 to provide a conditioning voltage on a line 90 for a seventh AND gate 92 which permits the stored signals in the line buffer 56 to be applied to the down-line portion of the incoming transmission line 26 via the first OR gate 36 and the modulator 38. After all of the stored information in the line buffer 56 has been read out, the line buffer empty signal is produced therein which is applied through line 74 to the second flip-flop 72 to produce conditioning voltages on lines 70 and 37 to condition the third and first AND gates, respectively. If an end of terminal message signal has not been produced, i.e., a request has not been made at the keyboard to transmit a terminal message block to the data processor, the third flip-flop 76 through line 35 provides the necessary voltage, along with the voltage on line 37 from the second flip-flop 72, to fully condition the first AND gate 34 to switch the line signals through the station or concentrator without delay.

If a line buffer empty signal has not been applied to the second flip-flop 72 the first AND gate 34 will not be fully conditioned and, therefore, the line signals from the output of the demodulator 32 cannot pass through the first AND gate 34 to the down-line portion of the incoming transmission line 26. Thus, the second flip-flop 72 continues to produce the necessary conditioning voltage on line 90 for the seventh AND gate 92 permitting the line buffer 56 to apply the signals stored therein to the down-line portion of the incoming line 26 while additional line signals may be applied to the line buffer 56 through the fourth AND gate 58. When the line buffer 56 becomes empty, the line buffer empty signal is applied to the second flip-flop 72 to provide the necessary conditioning voltage on line 37, along with the voltage on line 35, to effectively short circuit the line buffer 56. The conditioning voltage on line 90 for the seventh AND gate 92 is also applied to the second AND gate 50 through the second OR gate 80 to assure the application of signals from the demodulator 32 to the line buffer 56 when the line buffer 56 or the terminal buffer 66 are applying signals stored therein to the down-line portion of the incoming line 26.

Since the second flip-flop 72 continuously applies a partial conditioning voltage to the third AND gate 54 when the line buffer 56 is empty and since the first flip-flop 46 applies a voltage sufficient to fully condition the third AND gate 54 when the end of line message signal is applied thereto from line 44, it can be seen that a message block from the local terminal 64 can be passed through the concentrator when the keyboard 62 of terminal 64 applies an end of terminal message signal through the third AND gate 54 to the third flip-flop 76.

Accordingly, it can be seen that line message received at a local station of the system may pass through the station to the computer without delay if a message from an input terminal of the local station is not being applied to the transmission line. If an input terminal message is being applied to the transmission line, the line message is stored in a line buffer of the local station and read out of the line buffer and applied to the transmission line after completion of the transmission of the input terminal message. If additional line messages are received at the local station before the line buffer has been emptied the additional line messages will also be applied to the line buffer until all of the line messages have been read out of the line buffer. When both the line buffer and the terminal buffer are empty, line messages will pass through the station without being stored in a buffer and, therefore, without delay.

Signals from message blocks transmitted by the data processor 10 along the outgoing transmission line 22 have included therein in each message block an address which is detectable by a particular address decoder located at one of the stations. As shown in FIG. 2 of the drawing an address decoder 94 couples the outgoing line 22 to a printer 96 of the terminal 64 when signals peculiar to the address decoder 94 are received at the local station. Of course, the address decoder of each of the plurality of stations will be responsive to a different code.

It should be noted that in accordance with the present invention a system has been provided wherein each of a plurality of stations can transmit messages to a computer on a single line without the use of special signals for inviting stations to transmit their messages. Each input terminal of a local station in effect pre-empts at the completion of a line message block the transmission line as needed to thus provide in accordance with this invention a pre-emptive serial regenerative data transmission system. In the system of the present invention the message blocks need not be uniform. It is preferred that the line buffer have a storage capacity which is approximately equal to the storage capacity of the terminal buffer. It should also be understood that the system may include conventional means for locking the keyboard of the local terminal whenever the terminal buffer capacity has been fully utilized. Furthermore, means may be provided to prevent the application of signals to the line buffer which exceed the storage capacity thereof. The system may be modified to allow a local input terminal to preempt the line at any time by providing additional control signals which may be applied to line 86 to control the third flip-flop 76 by signals other than the terminal buffer empty signal. Traffic loadings should be determined for the particular intended use of the system by a queuing analysis. To maintain favorable time responses the transmission line should not be loaded to typically more than 75% of its capacity.

The invention has been illustrated as having three stations serially connected to a data processor but, of course, any desired number of stations may be served by the system depending upon traffic conditions on the incoming transmission line to the data processor. It can be seen that the system of this invention is particularly suitable for, for example, an airline reservation system.

While the invention has been particularly shown and described with reference to preferred embodiments thereof, it will be understood by those skilled in the art that various changes in form and details may be made therein without departing from the spirit and scope of the invention.

What is claimed is:

1. A communication system comprising
a transmission line,
a signal utilizing device and a plurality of stations serially interconnected in said line to said utilizing device, each of said stations including
means for producing electrical signals,
first means for selectively applying signals produced at its station to said transmission line,
means for conditioning said first means for said latter applying,
second means for selectively applying signals produced at other of said plurality of stations to said transmission line,
means for conditioning said second means for said latter applying,
third means for selectively storing signals produced at other of said plurality of stations, and
means for conditioning said third means for said latter storing,
means for conditioning said second means for selectively applying said stored signals to said transmission line,
said first means when conditioned applying said signals produced at its station to said transmission line when said unconditioned second means is not applying signals produced at other of said plurality of stations to said transmission line,
said third means when conditioned storing said signals produced at other of said plurality of stations when said first means is applying, and
said second means applying said stored signals to said transmission line when said first means is not applying.

2. A circuit for a communication station in a communication system having a plurality of said stations serially interconnected comprising
means for producing first signals of a given time duration,
means for receiving second signals of a given time duration from another of said stations,
storage means,
a common output terminal,
first means for selectively applying said first signals to said output terminal,
means for conditioning said first means for said latter applying,
second means for selectively applying said second signals to said output terminal,
means for conditioning said second means for said latter applying,
third means for selectively applying said second signals to said storage means,
means for conditioning said third means for said latter applying and,
means for conditioning said second means for selectively applying said stored signals to said output terminal,
said first means when conditioned applying said first signals to said output terminal when said unconditioned second means is not applying said second signals to said output terminal,
said third means when conditioned applying said second signals to said storage means when said first means is applying, and
said second means applying said stored signals to said output terminal when said first means is not applying.

3. A circuit for a communication station in a communication system having a plurality of said stations serially interconnected comprising
means for producing first signals of a given time duration,
means for receiving second signals of a given time duration from another of said stations,
storage means,
a common output terminal,
first means for selectively applying said first signals to said output terminal,
means for conditioning said first means for said latter applying, second means for selectively applying said second signals directly to said output terminal,
means for conditioning said second means for said latter applying,
third means for selectively applying said second signals to said output terminal through said storage means, and
means for conditioning said third means for said latter applying,
said first means when conditioned applying said first signals to said output terminal when said unconditioned second means and said unconditioned third means are not applying said second signals directly to said output terminal and said second signals to said output terminal through said storage means, respectively, and
said second means not applying when said third means is applying.

4. A circuit for a communication station in a communication system having a plurality of said stations serially interconnected comprising
first storage means for storing first signals therein,
means for receiving second signals from another of said stations,
second storage means,
a common output terminal,
first means for selectively applying said stored first signals to said output terminal,
means for conditioning said first means for said latter applying,
second means for selectively applying said second signals directly to said output terminal,
means for conditioning said second means for said latter applying,
third means for selectively applying said second signals to said output terminal through said second storage means, and
means for conditioning said third means for said latter applying,
said first means when conditioned applying said stored first signals to said output terminal when said unconditioned second means and said unconditioned third means are not applying said second signals directly to said output terminal and said second signals to said output terminal through said second storage means, respectively, and
said unconditioned second means not applying when said first means when conditioned or said third means when conditioned is applying.

5. A circuit for a communication station in a communication system having a plurality of said stations serially interconnected comprising
means for receiving message signals during a given time interval,
means for producing a first control signal at the end of said given time interval,
means for receiving blocks of signals of given time durations,
means for producing second control signals indicative of the start of each of said blocks of signals and for producing third control signals indicative of the end of each of said blocks of signals,
storage means,
a common output terminal,
first means responsive to said control signals for selectively applying said message signals to said output terminals,
means for conditioning said first means for said latter applying,
second means responsive to said control signals for selectively applying said blocks of signals directly to said output terminal,
means for conditioning said second means for said latter applying,
third means responsive to said control signals for selectively applying said blocks of signals to said output terminal through said storage means, and
means for conditioning said third means for said latter applying,
said first means when conditioned applying said message signals to said output terminal when said unconditioned second means and said unconditioned third means are not applying said blocks of signals directly to said output terminal and said blocks of signals to said output terminal through said storage means, respectively,
said second means applying when said first means and said third means are not applying, and
said third means applying when said first means and said second means are not applying.

6. A circuit for a communication station in a communication system having a plurality of said stations serially interconnected comprising
means for producing a first block of signals,
means for producing a control signal indicative of the end of said first block of signals,
first storage means for storing said first block of signals,
means for receiving blocks of message signals of given time durations from another of said stations,
means for producing control signals indicative of the start of each of said blocks of signals and for producing control signals indicative of the end of each of said blocks of signals,
second storage means,
a common output terminal,
first means responsive to said control signals for selectively applying the stored first block of signals to said output terminal,
means for conditioning said first means for said latter applying,
second means responsive to said control signals for selectively applying said blocks of message signals directly to said output terminal,
means for conditioning said second means for said latter applying,
third means responsive to said control signals for selectively applying said blocks of message signals to said output terminal through said second storage means, and
means for conditioning said third means for said latter applying,
said first means when conditioned applying the stored first block of signals to said output terminal when said unconditioned second means and said unconditioned third means are not applying said blocks of message signals directly to said output terminal and said blocks of message signals to said output terminal through said second storage means, respectively,
said second means applying when said first means or said third means is not applying, and
said third means applying when said first means and said second means are not applying.

7. A circuit for a communication station in a communication system having a plurality of said stations serially interconnected comprising
means for producing a first block of signals,
first storage means for storing said block of signals,
means for producing a control signal indicative of the completion of the storing of said first block of signals in said first storage means,
means for producing a control signal when said first storage means is empty,
means for receiving blocks of message signals of given durations from another of said stations,
means for producing control signals indicative of the start of each of said blocks of signals and for producing control signals indicative of the end of each of said blocks of signals,
second storage means, means for producing a control signal when said second storage means is empty,
a common output terminal,
first means responsive to said control signals for selectively applying the stored first block of signals to said output terminal,
means for conditioning said first means for said latter applying,
second means responsive to said control signals for selectively applying said blocks of message signals directly to said output terminal,
means for conditioning said second means for said latter applying,
third means responsive to said control signals for selectively applying said blocks of message signals to said output terminal through said second storage means, and
means for conditioning said third means for said latter applying,
said first means when conditioned applying the stored first block of signals to said output terminal when said unconditioned second means and said unconditioned third means are not applying said blocks of message signals directly to said output terminal and said blocks of message signals to said output terminal through said second storage means, respectively,
said second means when conditioned applying when said unconditioned first means or said unconditioned third means is not applying, and
said third means when conditioned applying when said unconditioned first means and said unconditioned second means are not applying.

8. A communication system comprising
a first transmission line,
a signal processing unit,
a plurality of stations serially interconnected by said line to said processing unit,
each of said stations including means for producing signals,
storage means,
first means for selectively applying signals produced by its own station to said first transmission line,
means for conditioning said first means for said latter applying,
second means for selectively applying signals produced by other of said plurality of stations directly to said transmission line,
means for conditioning said second means for said latter applying,
third means for selectively applying signals produced by other of said plurality of stations to said transmission line through its own storage means, and
means for conditioning said third means for said latter applying,
said first means when conditioned applying signals produced by its own station to said first transmission line when said unconditioned second means and said unconditioned third means are not applying signals produced by other of said plurality of stations directly to said transmission line and signals produced by other of said plurality of stations to said transmission line through its own storage means, respectively,
said second means when conditioned applying when said first or third means is not applying, and
said third means applying when said first means and said second means are not applying,
a second transmission line,
said signal processing unit including means for applying coded messages to said second transmission line, and
a decoding unit associated with each of said plurality of stations for coupling said station to said second transmission line.

References Cited by the Examiner

UNITED STATES PATENTS

| | | | |
|---|---|---|---|
| 2,059,204 | 11/1936 | Boswau | 340—163 |
| 2,164,956 | 7/1939 | Smith | 340—154 X |
| 2,636,672 | 4/1953 | Hamilton et al. | 340—172.5 X |
| 2,764,634 | 9/1956 | Brooks et al. | 179—18 |
| 2,874,368 | 2/1959 | Sibley | 340—163 |
| 2,946,986 | 7/1960 | Harrison | 340—172.5 |
| 2,953,647 | 9/1960 | Johanson | 179—90.2 |
| 3,007,136 | 10/1961 | Tyrlick | 340—147 |
| 3,029,414 | 4/1962 | Schrimpf | 340—147 |
| 3,061,192 | 10/1962 | Terzian | 340—172.5 X |

OTHER REFERENCES

IBM Technical Disclosure Bulletin, vol. 2, No. 4, December 1959, pp. 36–38.

NEIL C. READ, *Primary Examiner.*